United States Patent [19]
Zito

[11] Patent Number: 5,545,492
[45] Date of Patent: Aug. 13, 1996

[54] ELECTROCHEMICAL APPARATUS FOR POWER DELIVERY UTILIZING AN AIR ELECTRODE

[75] Inventor: Ralph Zito, Chapel Hill, N.C.

[73] Assignee: National Power PLC, Wiltshire, United Kingdom

[21] Appl. No.: 128,127

[22] Filed: Sep. 29, 1993

Related U.S. Application Data

[63] Continuation-in-part of Ser. No. 961,009, Oct. 14, 1992, abandoned.

[51] Int. Cl.$^6$ .................................................. H01M 8/06
[52] U.S. Cl. ............................ 429/29; 429/15; 429/42; 429/46; 429/206; 429/229
[58] Field of Search ................................. 429/39, 42, 29, 429/46, 206, 229, 14, 15

[56] References Cited

U.S. PATENT DOCUMENTS

| | | | |
|---|---|---|---|
| 2,615,932 | 10/1952 | Marko | 136/122 |
| 2,669,598 | 2/1954 | Marko | 136/122 |
| 3,077,507 | 2/1963 | Kordesch | 136/86 |
| 3,121,028 | 2/1964 | Story | 136/6 |
| 3,227,585 | 1/1966 | Langford | 136/86 |
| 3,518,250 | 2/1968 | Warszawski . | |
| 3,540,934 | 11/1970 | Boeke | 136/86 |
| 3,663,300 | 5/1972 | Nanis et al. | 136/86 |
| 3,902,916 | 9/1975 | Warzawski | 429/39 |
| 3,920,474 | 11/1975 | Zito, Jr. et al. | 136/86 |
| 4,038,460 | 7/1977 | Walsh et al. | 429/15 |
| 4,053,684 | 10/1977 | Zito, Jr. et al. | 429/15 |
| 4,069,371 | 1/1978 | Zito | 429/21 |
| 4,117,204 | 9/1978 | Zito, Jr. | 429/19 |
| 4,215,182 | 7/1980 | Ang et al. | 429/15 |
| 4,218,519 | 8/1980 | Frank | 429/15 |
| 4,230,549 | 10/1980 | D'Agostino et al. | 259/8 |
| 4,328,287 | 5/1982 | Sammells et al. | 429/15 |
| 4,339,473 | 7/1982 | D'Agostino et al. | 427/44 |
| 4,390,602 | 6/1983 | Struthers | 429/26 |
| 4,407,902 | 10/1983 | Kummer | 429/15 |
| 4,414,090 | 11/1983 | D'Agostino et al. | 204/252 |
| 4,469,760 | 9/1984 | Giner et al. | 429/21 |
| 4,485,154 | 11/1984 | Remick et al. | 429/14 |
| 4,615,108 | 10/1986 | Tomazic | 29/623.2 |
| 4,786,567 | 11/1988 | Skyllas-Kazacos et al. | 429/19 |
| 4,828,942 | 5/1989 | Licht | 429/50 |

FOREIGN PATENT DOCUMENTS

| | | | |
|---|---|---|---|
| 0039222 | 11/1981 | European Pat. Off. | H01M 16/00 |
| 165000 | 6/1985 | European Pat. Off. | H01M 10/42 |

(List continued on next page.)

OTHER PUBLICATIONS

Chemical Abstracts, vol. 115, No. 2, 15th Jul. 1991, Columbus, Ohio, US; Abstracts No. 12352x.

(List continued on next page.)

*Primary Examiner*—Samuel Barts
*Attorney, Agent, or Firm*—Antonelli, Terry, Stout & Kraus

[57] ABSTRACT

An electrochemical apparatus for power delivery employs an array of electrochemical cells which comprises an end $+^{ve}$ electrode and an end $-^{ve}$ electrode separated by one or more bipolar mid-electrodes each with a $+^{ve}$ side and a $-^{ve}$ side, the $+^{ve}$ side of each bipolar electrode comprising an electrically conductive substrate with a porous conductive surface. A bubbly dispersion of air/oxygen in an electrolyte is contacted with the $+^{ve}$ sides of the bipolar electrodes. The electrochemical apparatus of the invention may be used with an oxygen-sulfur couple with these reagents being provided for example as sodium salts in aqueous solutions, the overall reaction being:

$$4H_2O + 4S^{2-} + 2O_2 \rightarrow 8OH^- + 4S,$$

The process is preferably carried out in an array of cells (20), comprising a plurality of bipolar electrodes 13, each having a $+^{ve}$ side 12A and a $-^{ve}$ side 14A spaced from one another by membranes 16 which divide the cell into $+^{ve}$ and $-^{ve}$ chambers (22C and 24C) for posilyte and anolyte solutions (22, 24) which are circulated through the chambers.

21 Claims, 4 Drawing Sheets

FOREIGN PATENT DOCUMENTS

| | | | |
|---|---|---|---|
| 1291005 | 3/1962 | France . | |
| 1365569 | 5/1964 | France | H01M 8/70 |
| 1522304 | 3/1968 | France | H01M 8/24 |
| 2146142 | 7/1971 | France . | |
| 2146144 | 3/1973 | France | H01M 43/00 |
| 1938580 | 11/1970 | Germany | H01M 13/02 |
| 1571985 | 2/1971 | Germany | H01M 27/30 |
| 61-206180 | 9/1986 | Japan | H01M 12/08 |
| 63-205057 | 8/1988 | Japan | H01M 8/04 |
| 63-221562 | 9/1988 | Japan | H01M 8/18 |
| 1183071 | 7/1989 | Japan | H01M 8/02 |
| 980596 | 6/1963 | United Kingdom . | |
| 1212387 | 12/1964 | United Kingdom | H01M 27/30 |
| 1211593 | 11/1970 | United Kingdom | H01M 27/04 |
| 1237964 | 7/1971 | United Kingdom . | |
| 1210693 | 10/1971 | United Kingdom | H01M 27/00 |
| 1364795 | 8/1974 | United Kingdom | H01M 27/00 |
| 2042250 | 2/1979 | United Kingdom . | |
| 2010574A | 6/1979 | United Kingdom | H01M 10/36 |
| 1569399 | 6/1980 | United Kingdom | H01M 10/36 |
| WO89/05528 | 12/1988 | WIPO | H01M 10/44 |
| WO/9003666 | 6/1989 | WIPO | H01M 8/20 |

OTHER PUBLICATIONS

Extended Abstracts, vol. 80, No. 2, 5th Oct. 1980, Princeton, New Jersey, USA pp. 413–414.

Chemical Abstracts, vol. 83, No. 12, 22nd Sep. 1975, Columbus, Ohio US; Abstract No. 100755g.

Proceedings of the 20th Intersociety Energy Conversion Engineering Conf. vol. 2, Aug. 1985, pp. 2.105–2.110.

Extended Abstracts, vol. 83, No. 2., 9th Oct. 1983, Princeton, New Jersey USA pp. 165–166.

Journal of the Electrochemical Society, vol. 134, 5th May 1987 Manchester, New Hampshire, USA pp. 1064–1070.

Chemical Abstracts, vol. 112, No. 14, 2nd Apr. 1990, Columbus Ohio, US; Abstract No. 119956n.

Journal of the Electrochemical Society, vol. 117, No. 12, Dec. 1970, Manchester, New Hampshire USA; pp. 1527–1529.

Jounal of Electrochemical Society 1987, Vo. 134, No. 9 2137–2141; "An Energetic Medium For ELectrochemical".

Batteries International; Jan. 1992 pp. 80–81, Fabjan; Austrians Succeed with Zinc–Bromine.

Aqueous polysulphide flow–through electrodes PM Lessner J Appl Electrochem 22 (1992) 927–934.

Electrolysis of sodium sulphide solutions WR Fetzer (1928) 1787–180 7.

Electrode photoelectrochemical storage cells; Bratin; J. Electrochem Soc 129 11 (1982).

Bromine diffusion through Nafion perfluorinated ion exchange membranes FG Will; J. Electrochem Soc. 126 1 (1979) 36–41.

On the nature of blue solutions of sulfur W. Giggenbach J. Inorgs Nucl Chem 30 (1968) 3189–3201.

Equilibria involving polysulfide ions WF Giggenbach J. Inorg Chem 13 7 (1974) 1724–1730.

Kinetics of Polysulfide–thiosulfat disproportionation WF Giggenbach Inorg Chem 13 7 (1874) 1730–1733.

The blue solution of sulfur in water at elevated temperatures W. Giggenbach Inorg Chem 10 6 (1971) 1306–1308.

The blue solutions of sulfur in salt melts; W Giggenbach Inorg Chem 10 6 (1971) 1308–1311.

Kinetics of aqueous polysulfide solutions I; P Lessner J. ELectrochem Soc 133 12 (1986) 2510–2516.

Kinetics of aqueous polysulfide solutoins III;P. Lessner J. Electrochem Soc 133 12 (1986) 2517–2522.

Kinetics of aqueous polysulfide solutions; P. Lessner J. ELectrochem Soc 135 1 (1988) 258–259.

Thermodynamics of aqueous sulfur species; RC Murray J. Electro–Chem Soc 130 4 (1983) 866–869.

Cation exchange selectivity of a perfluosulfonate polymer HL Yager ACS Symposium Series 180 (1982) 25–39.

Transport properties of perfluosulfonate polymer membranes; HL Yeager ACS Symposium Series 180 (1982) 41–63.

The cluster newtork model of ion clustering; TD Gierke ACS Symposium Series 180 (1982) 283–307.

Patent Abstracts of Japan, vol. 8, No. 13 (E–222) (1450) 20th Jan. 1984.

* CHANGED FROM O₂ TO AIR

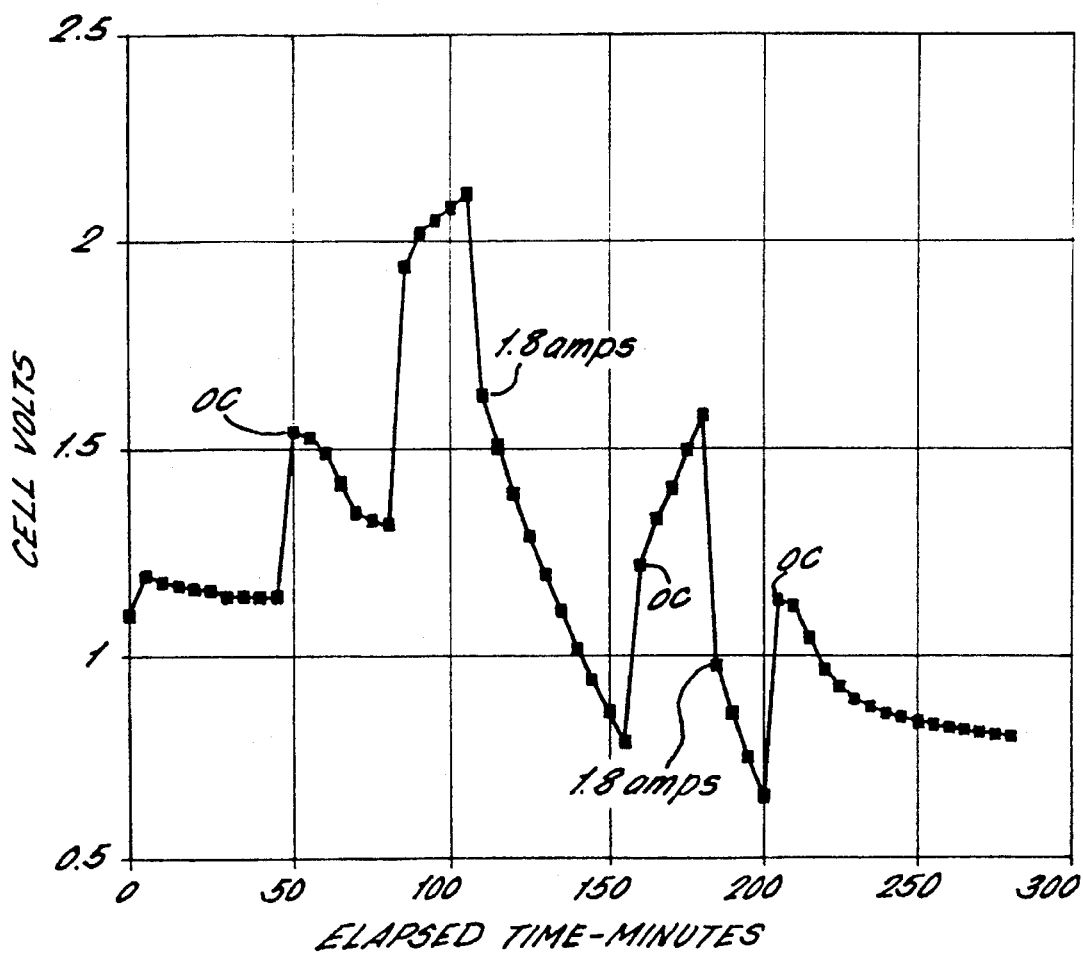

ELECTROCHEMICAL APPARATUS FOR POWER DELIVERY UTILIZING AN AIR ELECTRODE

CROSS REFERENCE TO RELATED APPLICATIONS

This application is a Continuation-in-Part of my United States patent application Ser. No. 07/961,009 filed 14th Oct. 1992 now abandoned.

FIELD OF THE INVENTION

The present invention relates generally to novel electrochemical apparatus for electrochemical energy storage and power generation systems wherein compensating electrochemical reactions occur at opposite positive (hereinafter $+^{ve}$) and negative (hereinafter $-^{ve}$) electrodes and energy is stored in, and drawn from, an electrolyte in charge and discharge cycles. The reactions in the class of such systems of interest for the purposes of this invention are substantially reversible such that driving current into such a system charges the system by storing energy in chemical reactions. These reactions take place on either side of an ion transport system (such as a membrane or multiple membranes and/or intermediate cell sections) with selective charge carriers being transported through the membrane. During power generation these chemical reactions reverse supplying current (power) to a load. Restoration, or recharging the cell, may also be accomplished by reconstituting the reagents.

The present invention more particularly relates to an electrochemical apparatus which incorporates therein one or more bipolar electrodes which makes use of an oxidant in the gas phase (air/oxygen), termed an "air electrode".

BACKGROUND OF THE INVENTION

Such energy processes and systems have been known for many years. Major limitations of these systems have resulted from practical application of what seems to be a simple direct chemical process. Hazardous materials, efficiencies, system size, plugging and clogging, gas formation, "plating out" or precipitation of the materials, membrane diffusion limitations, cost of materials and cost of operation highlight the practical problems. Another limitation of such systems is the loss of power output as the system discharges.

Much work has been carried out in the development of air breathing fuel cells. A limitation is the requirement of an electrode able to sustain, support or catalyze the reaction at a rate great enough for a particular application. Other limitations of the known air electrodes are: high electrical resistance, short lifetimes, and the required hydrophilic and hydrophobic capabilities.

The known air electrodes are of porous construction with one side in contact with the air and another side in contact with an electrolyte. The electrolyte must be prevented from flooding the entire electrode. The air/oxygen must be allowed to contact the electrode and the electrolyte in a three way interface. It has been proposed to make one side of the electrode hydrophobic and the other side of the electrode hydrophilic in an attempt to maintain a delicate balance somewhere within the electrode. The reaction which is involved at the air electrode in an alkaline solution is:

$$2e^- + \tfrac{1}{2}O_2 + H_2O \rightarrow 2OH^- \qquad \text{Eq. 1}$$

U.S. Pat. No. 3,634,140 discloses a fuel cell device utilizing air as the oxidant in which the flow through air electrode comprises two porous layers having different porosity, the layer located nearest the electrolyte side having the finer pores. The air atmosphere side and the electrolyte side are operated with a difference in pressure to prevent flooding of the pores of the air electrode.

U.S. Pat. No. 4,444,852 discloses a multiply laminar flow through air electrode which has an outer hydrophobic sheet adapted to contact the air and an inner hydrophilic electrolyte permeable active layer, the two outer layers being separated by one or more active layers comprising a mixture of active hydrophobic and hydrophilic agglomerates with catalyst disposed therein which increase in agglomerate size from the electrolyte permeable to the outer hydrophobic sheet.

GB-A-1364795 discloses a fuel cell in which a foaming agent is added to the electrolytes and the electrolytes agitated to form a foam containing the fuel and a foam containing the oxidant, the anode and the cathode being formed from smooth platinum and being positioned substantially only in the foam layers.

U.S. Pat. No. 4,328,287 discloses gas flow through electrodes for electrochemical cells having a porous flow through matrix with electrocatalysts supported on the surfaces of the matrix within the pores, the pores providing a through route for electrochemically oxidisable or reducible gas bubbles in a liquid electrolyte.

The zinc/air battery has been known for many years. This battery has a porous carbon $+^{ve}$ electrode, KOH paste electrolyte and a zinc $-^{ve}$ electrode. The original zinc/air battery was of U-shaped configuration and had the limitation of a slow discharge rate as the rate of air diffusing through the porous carbon electrode is proportional to the surface area of the carbon electrode in contact with the air. There is thus a limited mass transfer. Furthermore, this battery is essentially a primary battery and is not effectively electrically rechargeable because on attempting to recharge the battery zinc is redeposited unevenly at the zinc electrode, which limits the number of recharging cycles before the battery becomes inoperable. Furthermore, precipitates of zinc oxide and zinc carbonate are formed which cause contamination of the electrolytes and additional difficulties on attempting to recharge the system. An improved zinc/air battery employs a flat zinc plate as the $-^{ve}$ electrode and this enables more effective utilization of air/oxygen to be made by blowing air past the electrode face. There is thus a better mass transfer and hence a higher discharge rate than the U-shaped zinc/air battery, but the battery still suffers the same problems with regard to rechargeability.

Some attempts have also been made to replace the zinc in the zinc/air battery with other metals such as aluminium, iron, vanadium and magnesium. These devices have not, however, been satisfactorily electrically rechargeable.

U.S. Pat. No. 3,925,100 discloses an air cathode for use in metal/air cells such as zinc/air batteries which comprises a hydrophobic layer laminated to a hydrophilic layer. The air or oxygen is in contact with the hydrophobic layer through which it diffuses into the hydrophilic layer, but the electrolyte cannot pass through the hydrophobic layer.

It is an object of this invention to provide an electrochemical cell containing an improved air electrode for power generation and/or energy storage which is preferably electrically rechargeable and which provides economical power generation.

It is a further object of this invention to provide an electrochemical cell which contains an improved air electrode which is bipolar, which results in less costly cell arrays and greater volumetric energy densities.

It is a yet further object of this invention to provide an electrochemical cell with an improved air electrode with hydrophobic properties and which reduces problems associated with the loss of water from the prior art systems.

Another object of this invention is to provide an improved air electrode which provides substantially full power even at low states of charge of the system, i.e. the system power production stays constant over time maintaining substantially the same output until close to complete discharge.

SUMMARY OF THE INVENTION

The present invention provides an electrochemical apparatus for power delivery consisting of an array of electrochemical cells-which comprises a) an end $+^{ve}$ electrode and an end $-^{ve}$ electrode separated by one or more of bipolar mid-electrodes each of which has a $+^{ve}$ side and a $-^{ve}$ side which each face a respective $+^{ve}$ chamber and $-^{ve}$ chamber, the +ve side of each bipolar electrode comprising an electrically conductive substrate having a porous conductive surface, b) means to form an intimate mixture of air/oxygen with an electrolyte to produce a dispersion of bubbles in the electrolyte, and c) means to circulate the electrolyte produced in step (b) through the $+^{ve}$ chambers of the cell array.

The means to form an intimate mixture of air/oxygen with an electrolyte to produce a bubbly dispersion may be provided either external to or within the $+^{ve}$ chambers of the cell. The air/oxygen flow rate is preferably adjusted so that a near maximum cell voltage is realized at any given discharge current. If the gas flow is too great the electrolyte will be severely displaced giving the cell a higher internal resistance, whilst if the gas flow is too low the $+^{ve}$ electrode is starved of oxidant. Typical flow rates for use in the present invention are between 0.70 and 5 liters per minute for oxygen, and about 3 liters per minute for air. The electrolyte circulating through the $+^{ve}$ chambers of the cell may be a dilute alkaline solution, for example a solution of sodium, potassium or lithium hydroxide, or a dilute acid solution, for example hydrochloric acid or sulfuric acid. When operating using an acidic electrolyte circulating through the $+^{ve}$ chamber, a higher voltage will usually be achieved. The electrochemical reactions of $O_2$ in acidic and basic environments are qualitatively different. In acidic solution the reaction is:

$$O_2+4H^++4e^-=2H_2O \qquad \text{Eq. 2a}$$

which has an electrode potential against a standard hydrogen electrode of 1.229 V. The reaction in basic solution is:

$$O_2+2H_2O+4e^-=4OH^- \qquad \text{Eq. 2b}$$

which has an electrode potential of 0.401 V.

The first chemical equation shows the total reaction in the $+^{ve}$ compartment of a cell with sulfuric acid present and sodium ions migrating across the membrane to the $+^{ve}$ from the $-^{ve}$ side during discharge.

The bipolar electrodes are preferably separated from one another and from the end electrodes by an ion exchange membrane, preferably a cation exchange membrane.

The porous conductive surface on the electrically conductive substrate may be, for example, carbon particles, carbon fibres or hollow carbon rods in intimate contact with the substrate and with one another. The porous conductive surface on the electrode entraps oxygen from the air/electrolyte or oxygen/electrolyte bubbly dispersion where it is adsorbed/absorbed, thus being available for electrical discharge. The carbon particles, fibres or hollow rods may be pressed mechanically into intimate contact with one another and with the electrically conductive substrate, or bonded thereto, for example using any polymeric material which provides a good resistance to chemical attack, such as Kynar. Preferably a screen, such as a non-woven polypropylene fabric (Pellon cloth) is placed between the porous conductive surface of the $+^{ve}$ side of the bipolar electrode and the ion exchange membrane. The screen serves both to support the conductive surfacing material and to protect the membrane from damage.

The porous conductive surface will preferably have a thickness in the range of from 2.5 to 25 mm, more preferably a thickness in the range of from 5 to 15 mm. The porosity of the porous conductive surface on the electrode will preferably be in the range of from 0.7 to 0.85. For a surface which is formed from conductive particles, the porosity will depend not only upon the particle size of the particles and the pore volume of the particles, but also upon the packing density of the particles.

The $-^{ve}$ chambers of the cell array contain $-^{ve}$ electrodes and have an electrolyte circulating therethrough. In systems which can be charged as well as discharged, the fundamental chemical process which is carried out in the electrochemical cells is characterized by a chemical equation where the reaction proceeds in one direction in the charging of the system and in the opposite direction during power delivery by the system. Electrolytes which may be used in the $-^{ve}$ chambers of such electrically rechargeable systems include those which during power generation comprise a sulfide, a vanadium ($V^{2+}$) salt or a chromium ($Cr^{2+}$) salt. Examples of such systems are an oxygen/sulfur couple which may be represented by the following equation:

$$5Na_2S+2O_2+4H_2O \rightleftharpoons Na_2S_5+8NaOH \qquad \text{Eq. 3}$$

an oxygen/vanadium system which may be represented by the following equation:

$$2VSO_4+O_2+2H_2SO_4 \rightleftharpoons 2V(SO_4)_2+2H_2O \qquad \text{Eq. 4}$$

and an oxygen/chromium system which may be represented by the following equation:

$$4CrSO_4+O_2+2H_2SO_4 \rightleftharpoons 2Cr_2(SO_4)_3+2H_2O \qquad \text{Eq. 5}$$

The electrochemical reactions of these equations actually occur in separate but dependent reactions, the oxygen reaction taking place on the $+^{ve}$ side of the membranes and the other reaction on the $-^{ve}$ side of the membranes.

When charging (storing power) these reactions go from right to left, and when discharging (supplying power to a load) they go from left to right.

The array of electrochemical cells of the present invention may be used in a primary device which is not satisfactorily electrically rechargeable. In such devices the $-^{ve}$ side of each bipolar electrode comprises a metal such as zinc, aluminum, magnesium or iron.

The operation of the array of cells in accordance with the present invention is more particularly described below with reference to the oxygen/sulfur couple detailed in Eq. 3 above. Throughout this disclosure all the reactions shown operating with $Na^+$ ions may be carried out using potassium, lithium or ammonium ions. As previously mentioned, during charging Eq. 3 goes from right to left, and when discharging Eq. 3 goes from left to right.

During discharging Na⁺ ions are transported across the membranes from the $-^{ve}$ sides to the $+^{ve}$ sides supplying the needed Na and transforming $Na_2S$ to $Na_2S_5$. NaOH is formed in the $+^{ve}$ sides via the oxidation of $O_2$ and water. At full charge, each $+^{ve}$ side is a very dilute solution of NaOH, and each $-^{ve}$ side is a concentrated solution of $Na_2S$. At substantially full discharge, each $+^{ve}$ side is concentrated NaOH and each $-^{ve}$ side is a lower molarity, but concentrated solution of $Na_2S_5$. The molecular sulfur in the $-^{ve}$ sides remains in solution because the sodium sulfide will dissolve or solubilize the molecular sulfur formed upon discharge up to the penta-sulfide form.

During charging Na⁺ ions are transported across the membranes from the $+^{ve}$ sides to the $-^{ve}$ sides to balance the charge and transform $Na_2S_5$ to $Na_2S$. The sulfur which is present as a doubly charged polysulfide ion $S^{2-}.S_x$ (where x may be as high as 4), is reduced initially to $S^{2-}.S_{x-1}$, and eventually to $S^{2-}$.

The reaction which occurs at the $+^{ve}$ electrodes on discharge is not entirely clear but is probably described by the following equation:

$$O_2 + 2H_2O + 4e^- \rightarrow 4OH^- \quad +0.41 \text{ V} \qquad \text{Eq. 6}$$

Flow of the electrolytes on both sides of the membranes is provided, preferably a re-circulation rather than a once through flow in the majority of end uses. The electrolyte circulating through the $+^{ve}$ chambers during discharge comprises either an air or oxygen and water mixture, or an air/dilute NaOH mixture. An intimate mixture of air or oxygen with the water or dilute NaOH solution may be formed by bubbling an air or oxygen stream into water or dilute NaOH to form a bubbly dispersion either external to or within the cell. The water or dilute NaOH may be stored in an independent container. Similarly, the electrolyte circulating through the $-^{ve}$ chambers during discharge comprises $Na_2S$ which may be stored in an independent container.

As the electrolyte in the $-^{ve}$ sides is circulated, the $S^{2-}$ is absorbed out of solution at a surface of the $-^{ve}$ electrodes and/or in a porous surface thereof. This provides a benign porous structure where the $S^{2-}$ solution may reside in high concentrations (i.e. be readily available). The porous nature provides a large surface area which enhances efficiency during discharge. In addition, the surface of the $-^{ve}$ electrodes is preferably coated with an active ingredient, preferably an activated carbon, which augments the reaction kinetics providing $S^{2-}$ ions promptly for subsequent discharge requirements, and thus providing full power until substantially fully discharged. During this discharge the output voltage of the cell is near constant with little polarization losses.

When the cell is charged, Na⁺ ions are transported across the cation exchange membranes from the $+^{ve}$ sides to the $-^{ve}$ sides of the cell. The Na⁺ ions transform the $Na_2S_x$ to $Na_2S$ and in the process S is reduced to $S^{2-}$. At the $+^{ve}$ sides free oxygen is produced at the $+^{ve}$ electrode surfaces and expelled through a vent to the atmosphere as the electrolyte is circulated. Alternatively, the electrolytes may be recharged electrically outside the cell in a separate system, in order to prevent any deleterious effects of the generation of oxygen at the $+^{ve}$ electrodes, during charging, on the electrode materials themselves.

If any carbonates are formed in the $+^{ve}$ sides of the cell during the generation of power (which situation may be encountered if air, rather than oxygen is introduced into the $+^{ve}$ sides) they will be converted at the $+^{ve}$ electrodes on charging the cell to carbon dioxide which will be vented, together with the oxygen formed on charging.

Furthermore, because oxygen is a weak oxidising agent, any S which crosses the membrane stays in solution and does not form precipitates. Thus there is no need for any filters to be included in the electrolyte circulation flow system.

A filter may, however, advantageously be used to filter air before it is admixed with the dilute NaOH, the filter thereby removing extraneous dust and other particles from the air.

The ion exchange membrane used in the invention is preferably a cation type (positive ions, such as Na⁺ and K⁺, will be transported through it) that also provides an effective block against $S^{2-}$ migration through the membrane.

Alternative preferred embodiments substitute potassium, lithium or ammonium and other appropriate substitutes for the sodium in one or both of the hydroxide and sulfide solutions.

Other objects, features and advantages will be apparent from the following detailed description of preferred embodiments thereof taken in conjunction with the accompanying drawings in which:

BRIEF DESCRIPTION OF THE DRAWINGS

FIG. 4 is a graph of the discharge characteristics of the cell of Example 2.

DETAILED DESCRIPTION OF THE PREFERRED EMBODIMENTS

The electrochemical cell or array of cells of the invention is described below with reference to the specific system utilizing air/sodium hydroxide and sodium sulfide. It will be understood, however, that other salts may be substituted for the sodium hydroxide and sodium sulfide referred to specifically herein.

It will also be understood that whilst the air electrode used in the present invention is described in an electrochemical process using an oxygen/sulfur couple, the general teaching and description hereinbelow are of relevance to the air electrode of the invention when used with other chemical reactions.

Figure 1:
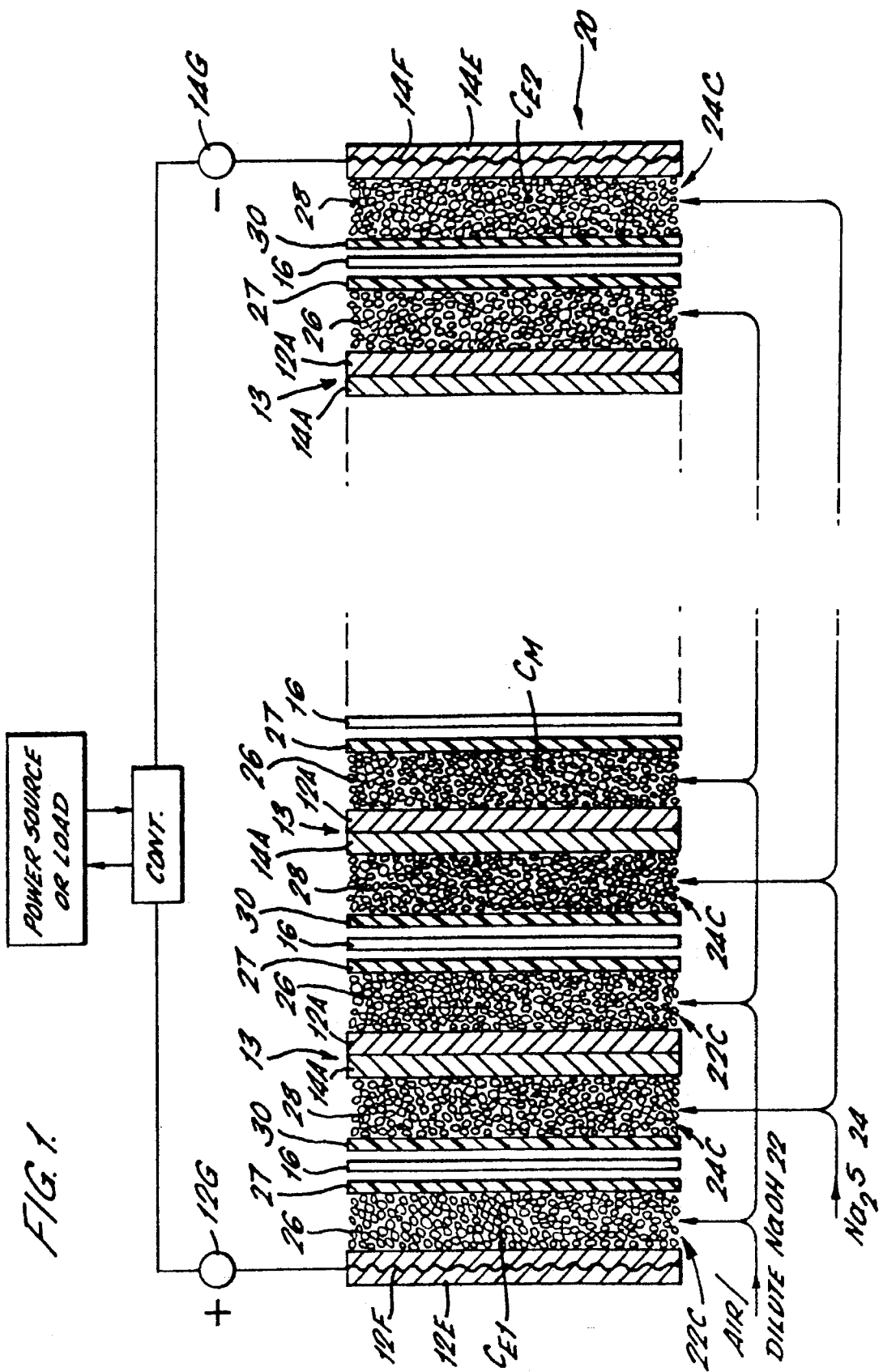
FIG. 1 is a schematic view of an array of cells according to a preferred embodiment of the invention.

FIG. 1 shows a cell array 20 of multiple cells connected in electrical series and fluid parallel End electrodes 12E ($+^{ve}$) and 14E ($-^{ve}$) and multiple mid-electrodes 13 (each one having a $+^{ve}$ electrode portion 12A and $-^{ve}$ electrode portion 14A) are spaced from each other by cation exchange membranes 16 to form end cells $C_{E1}$ and $C_{E2}$ and an array of n# of mid cells $C_M$ (typically 10–20; but note much smaller and much larger numbers of cells can be accommodated). The cation exchange membranes 16 are selected to minimize migration of oxygen from the $+^{ve}$ side to the $-^{ve}$ side and to minimize migration of $S^{2-}$ ions from the $-^{ve}$ side to the $+^{ve}$ side. The end electrodes 12E ($+^{ve}$) and 14E ($-^{ve}$) have internal conductors 12F and 14F (typically copper screens) encapsulated therein and leading to external terminals 12G, 14G which are connected to external loads (e.g. to a motor M via a control circuit CONT, the motor driving a vehicle) or power sources (e.g. a utility power grid when used as a load levelling device). In each internal cell an electrode 13 acts as a bipolar electrode. That is the electrode forms the $-^{ve}$ side 14A of one cell while simultaneously forming the $+^{ve}$ side 12A of the subsequent cell.

The end $+^{ve}$ electrode 12E and the $+^{ve}$ electrode portions 12A of the bipolar electrodes 13 each have a porous conductive surface provided by particles of activated carbon 26 such as G-212 particles (North American Carbon Co.) or UU grade particles (Barnebey-Cheney Co.). The activated carbon particles are pressed into intimate contact with the surface of the electrodes or are bonded thereto. The carbon particles 26 are restrained by non-woven screens 27, for example non-woven polypropylene cloth, e.g. Pellon cloth and separated thereby from the membranes 16, thus preventing damage to the membranes.

The end $-^{ve}$ electrode 14E and the $-^{ve}$ electrode portions 14A of the bipolar electrodes 13 also, in this embodiment, are each shown with a porous conductive surface provided by particles of activated carbon 28 which may be the same as, or different from, the activated carbon particles 26 which surface the $+^{ve}$ electrodes. The carbon particles 28 are restrained by non-woven screens 30 which may be the same as, or different from, the screens 27.

A foamy air/dilute NaOH mixture 22 produced external to the cell array is passed into the bottom of the $+^{ve}$ chamber 22C of each cell. A solution of $Na_2S$, 24, is passed into the bottom of the $-^{ve}$ chamber 24C of each cell.

When the cell array is in the substantially fully charged state, a solution of NaOH of 0.5 to 1.0 molar concentration exists in the chambers 22C of the cell and a solution of $Na_2S$ of 3 to 4 molar, exists in the chambers 24C of the cell.

When providing power to a load the cell is discharging, and reversible reactions occur at the two electrodes. Sodium ions, $Na^+$, are transported across membrane 16 from the $-^{ve}$ side to the $+^{ve}$ side of the cell. At the $+^{ve}$ electrode 12, oxygen molecules are reduced forming $OH^-$ ions. At the $-^{ve}$ electrode sulfide ions, $S^{2-}$, are oxidised to molecular sulfur (which is solubilized by the sodium sulfide). The free electrons produced at the $-^{ve}$ electrode form the current through a load. The chemical reactions at the electrodes produces 0.60 to 0.70 volts per cell.

Figure 2:
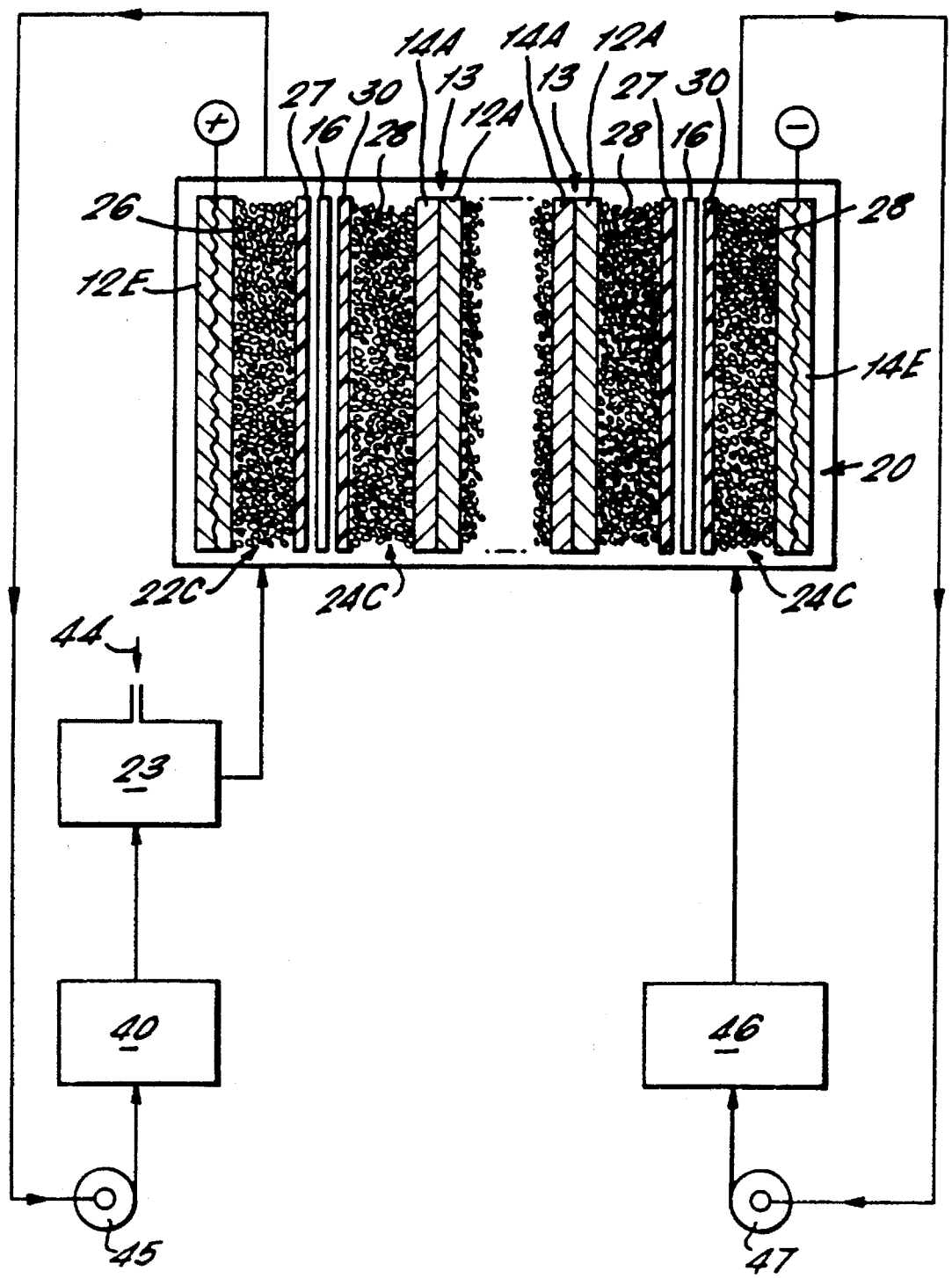
FIG. 2 is a block diagram of a full system using the cell of FIG. 1.

FIG. 2 is a block diagram of a full system using the cell 20 of FIG. 1. At the $+^{ve}$ electrode side a dilute solution of NaOH of about 1 molar is held in tank 40 from which it is passed to a mixing tank 23 where it is mixed with air entering via line 44. The foamy air/dilute NaOH mixture is then passed into the bottom of chambers 22C of the cell 20. The foamy mixture contacts the porous conductive surfaces 26 of the electrodes 12 during its passage through the chambers 22C. The sodium hydroxide is recirculated to tank 40 by means of pump 45.

At the $-^{ve}$ electrode a solution of sodium sulfide $Na_2S$, is held in a tank 46 from which it is passed into the bottom of chambers 24C of the cell 20. The $Na_2S$ solution is recirculated to tank 46 by means of pump 47. The tanks 40 and 46 can be replaced with freshly charged electrolyte by exchanging the expended tanks with new tanks and/or refilling the old tanks from charged supply sources.

Fabrication of Electrodes

End electrodes differ from the mid electrodes because they must have a metallic conductor embedded within the structure running across the electrode area. This is required because the resistivity of the substrate material from which they are formed is too high to allow adequate electrical conduction to an external electrical connector. For example a 25 cm by 25 cm square (10 inch by 10 inch square) of substrate material 0.25 cm (0.10 inch) thickness will have a resistance of about 10 ohms where a corresponding cell has an internal resistance of about 0.01 ohms. A sheet of copper of 0.025 cm (0.010 inch) thickness with approximately the same area embedded into the electrode will reduce the effective resistance to about 100 micro ohms. The end electrodes are unipolar, whereas the mid-electrodes are bipolar. The conductor sheet is a thin screen structure embedded along the length of the end electrodes which make mechanically good contact along the current path.

The process of making the bipolar mid-electrodes is as follows. Substrates are formed of graphite flakes mixed with a plastic binder or other suitable binder, generally in a 1:1 weight ratio of such components. The mixture is freed from moisture by heating and/or desiccation methods, formed as sheets and hot pressed at temperatures and pressures appropriate to the materials used.

The substrate surface which is to form the $+^{ve}$ electrode is then surfaced with a porous conductive surface, for example activated carbon particles, either by mechanically pressing the conductive surfacing material into intimate contact with the face of the electrode, or by bonding the conducting surfacing material to the face of the electrode. In the first method, a thick (greater than 2.5 mm) layer of unbonded loose carbon particles is mechanically held in contact with the substrate surface, the substrate generally first being coated by embedding a thin layer of smaller sized carbon particles on the surface. This intermediate surfacing layer provides an acceptable low resistance contact with the layer of loosely held carbon particles for interaction with the oxygenated electrolyte.

In the second method, loose carbon particles are bonded to the substrate surface using an appropriate polymeric material which is resistant to chemical corrosion, for example employing as a bonding agent powdered Kynar at a level of from 15% to 20% by weight.

A screen, for example a non-woven polypropylene screen (e.g. Pellon cloth) is preferably placed over the conductive surfacing material in order to assist in retaining the conductive surfacing material in position. In a preferred embodiment of the invention the substrate surface which is to form the $-^{ve}$ electrode is surfaced with a porous conductive surface in the manner as described above.

End electrodes are prepared by making a substrate by mixing graphite flakes and a plastic binder together, in the same general manner as described for the process of making bipolar mid-electrodes. Two substrates are formed into a sandwich with a conductive screen, e.g. a copper screen, placed therebetween. This assembly is hot pressed to form the electrode which is then surfaced (in the manner as described above for mid-electrodes) with a conductive surfacing material to form a $+^{ve}$ end electrode. The same surfacing treatment is also used in formation of $-^{ve}$ end electrodes in a preferred embodiment of the invention.

Membranes

The preferred cation exchange membranes for use in the present invention are a heterogeneous structure made by Sybron Chemical Co. called IONAC MC 3470 or NAFION made by Du Pont de Nemours. IONAC is a cation exchange membrane containing sulfonated resins as the functional materials bonded together with Kynar. The material is bonded to a fibrous support sheet of glass cloth or polymer fiber. The specifications for this membrane are: 0.40 cm (0.016 inches) thick, 96% permselectivity and 5 ohms/square cm in 1N NaCl.

Other cation exchange membranes may also be used.

Energy Density

In a preferred embodiment using the electrochemical apparatus of the present invention, the process employed for energy storage in the reaction according the present invention is described by the following basic reaction:

$$O_2 + 2H_2O + S^{2-} \rightleftharpoons 4OH^- + S \qquad \text{Eq. 7A}$$

The chemical reaction given above includes only those species which are directly and necessarily involved in the process. However, in order for the process to take place in a practical sense cations and excess water must be accounted for and the actual reaction, for a potassium salt system is:

$$4H_2O + 5K_2S + 2O_2 \rightleftharpoons 8KOH + K_2S_5 \qquad \text{Eq. 7B}$$

Whilst for a sodium system the reaction is:

$$4H_2O + 5Na_2S + 2O_2 \rightleftharpoons 8NaOH + Na_2S_5 \qquad \text{Eq. 7C}$$

On the basis of the reaction given in Eq. 7B above, the maximum available energy density if the reaction were to proceed to completion and there were no other losses due to polarization or ohmic effects is calculated using the total weight of reagents in Eq. 7B and the electron exchange of $$5S^{2-} = S_5^{2-} + 8e^-$$

Assuming 1 volt as a mean value for the reaction open circuit potential, then there are 686 grams of reactant for an energy of 208 WH giving an energy density of 303 WH/kg.

However, the process used in the present invention is an "air breathing" system and the oxygen is not carried within the system when it is fully charged. Thus, the energy density of the system at the onset of discharging is the energy divided by the reagent weights exclusive of oxygen, that is 334 WH/kg.

In a practical system the maximum solubility of $K_2S$ in water is about 5 Molar. A realistic configuration for an array of cells would be about 1 liter of 0.5M KOH as an initial oxidising agent (positive electrolyte) per 1 liter of 5M $K_2S$ solution as a reducing agent (negative electrolyte). Upon discharge the solutions would be approximately 8.5M KOH and 1M $K_2S$, respectively.

The energy density of this system, assuming a completely lossless reaction, would be 85 WH/kg.

For 5 Molar, $K_2S$, this gives a total weight percentage of sulfur used in the negative electrolyte of approximately 17.5%.

SPECIFIC EMBODIMENTS

The present invention will be further described with reference to the following non-limiting Examples, in which an electrochemical cell array in accordance with the present invention is used in an electrochemical process employing an oxygen/sulfur couple.

EXAMPLE 1

A. Fabrication of end electrodes

Two substrates were prepared by mixing graphite flakes (#4012 graphite flakes of Asbury Carbon Co.) with a polyvinylidene fluoride, PVDF, binder (Penwalt's #461) in a 1:1 weight ratio. The mixture was heated to remove moisture, formed into sheets and hot pressed at a temperature of 177° C. (350° F.) and a pressure of 1723 kPa (250 psi) for 10 minutes, and then cooled at the same pressure between water cooled platens.

A stack was then formed, from bottom to top, of an aluminum base plate, a Teflon sheet, one substrate, a copper screen (0.025 cm thick), the other substrate, a Teflon sheet, high temperature rubber sheet, and finally another aluminum base plate. The assembly was then pressed at 1034 kPa (150 psi) at 177° C. (350° F.) for 10 minutes, and then cooled at the same pressure between water-cooled platens.

The substrate to be surfaced had its edges covered with tape and was placed on an aluminum base plate covered with a Teflon sheet and a mixture of 80% graphite and 20% Kynar sprinkled over the surface. The surface of the substrate was then sprinkled with a layer of activated carbon particles, for example, G212 of North American Carbon Co., or UU of Barnebey-Cheney Co.

The specifications of these activated carbon particles are as follows:

| G212 | |
|---|---|
| Bulk density | 0.38 to 0.44 (ASTM 2854) |
| Hardness | 92 (ASTM D2862) |
| Particle size | 90% pass through an 8 × 16 mesh |
| Pore volume (within the particles) - $H_2O$ mls per gram | 0.90–1.00 |
| UU Grade | |
| Bulk density | 0.45 to 0.55 (ASTM 2854) |
| Particle size | 90% pass through a 50 × 200 mesh |
| Pore volume (within the particles) - $H_2O$ mls per gram | 0.85–0.95 |

A high temperature rubber sheet was placed on top of the surfaced substrate, followed by a Teflon sheet and an aluminum base plate. The structure was then pressed at 517 kPa (75 psi) at 177° C. (350° F.) for 10 minutes, and then cooled at the same pressure between water-cooled platens.

The tape was then removed from the edges of the surfaced side and a rubber "picture" frame placed on top of the cleared border. The electrode was then placed with the surfaced side uppermost onto an aluminum base plate covered with a Teflon sheet and the top surface of the structure covered with a Teflon sheet and an aluminum base plate. The edges of the assembly were pressed at 2413 kPa (350 psi) for 210 minutes, and then cooled at the same presure between water-cooled platens. This step sealed the substrate sheets along the edges in order to ensure that the copper screen was totally encapsulated to prevent corrosion by the electrolyte.

B. Preparation of bipolar electrodes

Substrates for the bipolar electrodes were prepared in the manner as described in A above.

One surface of the substrate was then coated with G212 activated carbon particles (North American Carbon Co.). A high temperature rubber sheet was placed on top of the surfaced substrate, followed by a Teflon sheet and an aluminum base plate. The structure was then pressed at 517 kPa (75 psi) at 177° C. (350° F.) for 10 minutes, and then cooled at the same pressure between water-cooled platens. This surface formed the $+^{ve}$ side of the bipolar electrode.

The other surface of the substrate was then coated with UU activated carbon particles (Barnebey-Cheney Co.) and hot pressed and cooled in the same manner as for the formation of the $+^{ve}$ side of the bipolar electrode. The UU surfaced side formed the $-^{ve}$ side of the bipolar electrode.

C. Cell fabrication

A cell was fabricated with an end $+^{ve}$ electrode surfaced with G212 activated carbon, a bipolar electrode as described above and an end $-^{ve}$ electrode surfaced with UU activated carbon. The end electrodes were separated from the bipolar electrode to form $+^{ve}$ chambers by means of a Nafion membrane with a protective layer of Pellon cloth. The effective area of each electrode was 25 sq.cm (10 sq.in.).

$-^{ve}$ side: 0.20 inch spacing to the membrane, electrolyte volume=250 cc, of 2M $Na_2S$. A solution of monosulfide was employed to ensure that the $-^{ve}$ electrolyte was fully charged, and that it did not limit the cell performance by polarization effects.

$+^{ve}$ side: 0.20 inch spacing to the membrane, electrolyte volume=250 cc of 1M NaOH. Oxygen was introduced into the $+^{ve}$ electrolyte just before the electrolyte entered the bottom of the $+^{ve}$ chambers of the cell. The oxygen flow rate was 2 liters/minute. The bubbly electrolyte was circulated through the $+^{ve}$ chambers of the cell at a rate of 0.5 liters/minute. The $-^{ve}$ electrolyte was circulated through the $-^{ve}$ chambers of the cell at a rate of 0.6 liters/minute. During the experiment air was substituted for oxygen after 30 minutes.

D. Cell Performance

This cell was discharged at 1 amp for 30 minutes using oxygen to produce the bubbly electrolyte and then for a further 25 minutes using compressed air.

Figure 3:
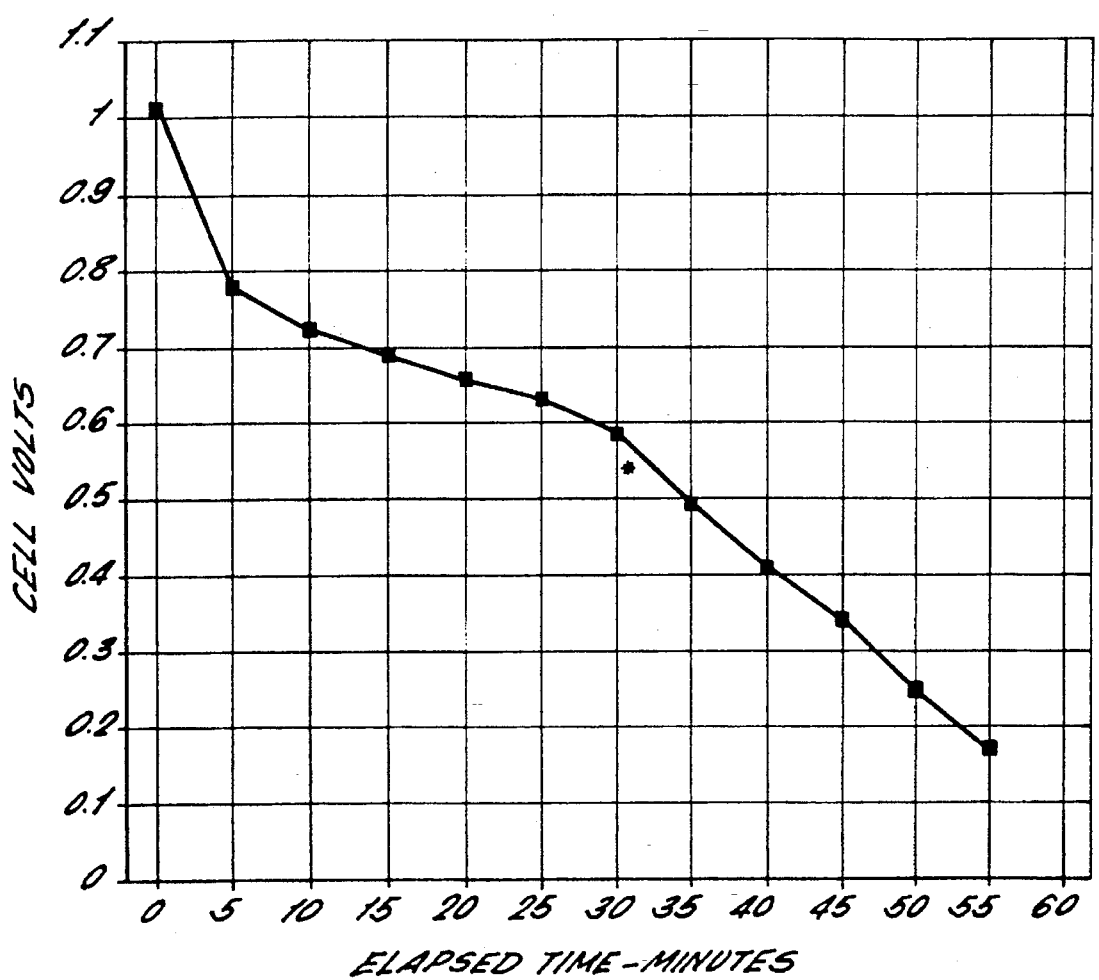
FIG. 3 is a graph of the discharge characteristics of the cell of Example 1.

FIG. 3 shows the voltage versus time data during this run.

EXAMPLE 2

In this Example the cell as described in Example 1 was operated using a 1M $H_2SO_4$ electrolyte in the $+^{ve}$ chambers of the cell. Oxygen was introduced into the $+^{ve}$ electrolyte just before the electrolyte entered the bottom of the $+^{ve}$ chambers of the cell. The oxygen flow rate was 1.5 liters/minute. The bubbly electrolyte was circulated through the $+^{ve}$ chambers of the cell at a rate of 0.5 liters/minute. The $-^{ve}$ electrolyte was circulated through the $-^{ve}$ chambers of the cell at a rate of 0.6 liters/minute.

The cell was discharged at 1.8 amps and periodically placed on open circuit. FIG. 4 shows the voltage versus time data obtained. It will be noted that higher cell voltages were obtained using an acidic electrolyte circulating through the $+^{ve}$ chambers of the cell (FIG. 4) than when using an alkaline electrolyte circulating through the $+^{ve}$ chambers of the cell (FIG. 3).

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

I claim:

1. An array of electrochemical cells forming an electrochemical apparatus for energy storage and power delivery which comprises a) an end $+^{ve}$ electrode and an end $-^{ve}$ electrode separated by one or more of bipolar mid-electrodes each of which has a $+^{ve}$ side and a $-^{ve}$ side which each face a respective $+^{ve}$ chamber and $-^{ve}$ chamber, the $+^{ve}$ side of each bipolar electrode comprising an electrically conductive substrate having a porous conductive surface, the bipolar electrodes being separated from one another by cation exchange membranes, b) means to form an intimate mixture of air/oxygen with an electrolyte to produce a dispersion of bubbles in the electrolyte, and c) means to circulate the electrolyte produced in step b) through the $+^{ve}$ chambers of the cell array.

2. An array of cells as defined in claim 1 wherein the porous conductive surface on each of the $+^{ve}$ sides of the bipolar electrodes is selected from the group consisting of carbon particles, carbon fibres and hollow carbon rods in intimate contact with one another and with the substrate surface.

3. An array of cells as defined in claim 2, wherein the porous conductive surface has a thickness greater than 2.5 mm.

4. An array of cells as defined in claim 2, wherein each of said bipolar electrodes further comprises a non-woven screen provided between said porous conductive surface and an adjacent cation exchange membrane so as to restrain said porous conductive surface.

5. An array of cells as defined in claim 1 wherein the means to form the intimate mixture of air/oxygen with an electrolyte is external to the $+^{ve}$ chambers of the cell.

6. An array of cells as defined in claim 1 wherein the means to form the intimate mixture of air/oxygen with an electrolyte is within each of the $+^{ve}$ chambers of the cell.

7. An array of cells as defined in claim 1 wherein the electrolyte circulating in the $+^{ve}$ chambers is a dilute alkaline solution.

8. An array of cells as defined in claim 7 wherein the electrolyte is selected from the group consisting of sodium hydroxide, potassium hydroxide, lithium hydroxide and ammonium hydroxide.

9. An array of cells as defined in claim 1 wherein the electrolyte circulating in the $+^{ve}$ chambers is a dilute acid solution.

10. An array of cells as defined in claim 9 wherein the electrolyte is selected from the group consisting of hydrochloric acid and sulfuric acid.

11. An array of cells as defined in claim 1 wherein the the electrolyte circulating through the $-^{ve}$ chambers during power delivery is selected from a sulfide, a vanadium ($V^{2+}$) salt and a chromium ($Cr^{2+}$) salt.

12. An array of cells as defined in claim 1 which is electrically restorable or chemically replenishable.

13. An array of cells as defined in claim 12 wherein the electrical restoration comprises means to reverse the polarity on the $+^{ve}$ and $-^{ve}$ electrodes and means to provide sufficient voltage to drive the chemical reactions in the reverse direction.

14. An array of cells as defined in claim 12 wherein chemical replenishment comprises means to circulate one or both of the electrolytes from the $+^{ve}$ and/or $-^{ve}$ chambers to storage means comprising a volume of electrolyte greater than the volume of the respective $+^{ve}$ and/or $-^{ve}$ chambers for extended delivery of power over a longer discharge cycle than the volume of the $+^{ve}$ and/or $-^{ve}$ chambers alone would permit.

15. An array of electrochemical cells as defined in claim 1 which are connected in electrical series.

16. An array of cells as defined in claim 1, wherein said porous conductive surface has a porosity in the range of from 0.7 to 0.85.

17. An array of cells as defined in claim 1, wherein the porous conductive surface on each of the $+^{ve}$ sides of the bipolar electrodes comprises a material selected from the group consisting of carbon particles, carbon fibers, and hollow carbon rods bonded to the $+^{ve}$ side of the electrically conductive substrate.

18. An array of cells as defined in claim 17, wherein the porous conductive surface has a thickness greater than 2.5 mm.

19. An array of cells as defined in claim 17, wherein each of said bipolar electrodes further comprises a non-woven screen provided between said porous conductive surface and an adjacent cation exchange membrane so as to restrain said porous conductive surface.

20. An array of cells as defined in claim 1, wherein said end $+^{ve}$ electrode comprises a porous conductive surface.

21. An array of cells as defined in claim 1, wherein said end $-^{ve}$ electrode and the $-^{ve}$ side of each bipolar electrode comprises a porous conductive surface.

* * * * *